(12) United States Patent
Yu et al.

(10) Patent No.: US 8,295,639 B2
(45) Date of Patent: Oct. 23, 2012

(54) IMAGE CORRECTION APPARATUS, IMAGE CORRECTION METHOD, AND IMAGE CORRECTION PROGRAM

(75) Inventors: Shanshan Yu, Kawasaki (JP);
Masayoshi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 346 days.

(21) Appl. No.: 12/768,937

(22) Filed: Apr. 28, 2010

(65) Prior Publication Data

US 2010/0209015 A1 Aug. 19, 2010

Related U.S. Application Data

(63) Continuation of application No. PCT/JP2007/072029, filed on Nov. 13, 2007.

(51) Int. Cl.
*G06K 9/40* (2006.01)

(52) U.S. Cl. ........................................................ 382/274

(58) Field of Classification Search ........... 382/254–275
See application file for complete search history.

(56) References Cited

U.S. PATENT DOCUMENTS 6,285,778 B1 * 9/2001 Nakajima et al. ............. 382/104
2001/0007599 A1 7/2001 Iguchi et al.
2003/0002726 A1 * 1/2003 Ozawa et al. ................. 382/132
2005/0207669 A1 9/2005 Kameyama

FOREIGN PATENT DOCUMENTS

| JP | 05-258053 | 10/1993 |
| JP | 2001-189863 | 7/2001 |
| JP | 2005-269542 | 9/2005 |

OTHER PUBLICATIONS

Notice of Rejection dated Feb. 28, 2012 from corresponding Japanese Application No. 2009-540995 (English translation).

* cited by examiner

*Primary Examiner* — Alex Liew
(74) *Attorney, Agent, or Firm* — Greer, Burns & Crain, Ltd

(57) ABSTRACT

An image correction apparatus stores therein a plurality of correction curves for determining a correction amount, calculates a feature value of average brightness in an input image, determines whether the calculated feature value is equal to or greater than a first threshold, and, for the input bright image with the feature value equal to or greater than the first threshold, counts the number of pixels equal to or less than a second threshold in the input image. The image correction apparatus calculates a feature value of average brightness from pixel values of the counted pixels, on a basis of whether the calculated feature value is equal to or greater than a third threshold, or, whether the number of pixels equal to or greater than the third threshold is a fourth threshold or more, obtains a correction curve to correct the input image.

15 Claims, 13 Drawing Sheets

| AVERAGE BRIGHTNESS | 0 TO 6 | 7 TO 12 | 13 TO 20 | 21 TO 25 | 26 TO 30 | 31 TO 40 | 40 OR MORE |
|---|---|---|---|---|---|---|---|
| SELECTED CURVE | 1 | 2 | 3 | 4 | 5 | 6 | 7 |

FIG.14
(1)
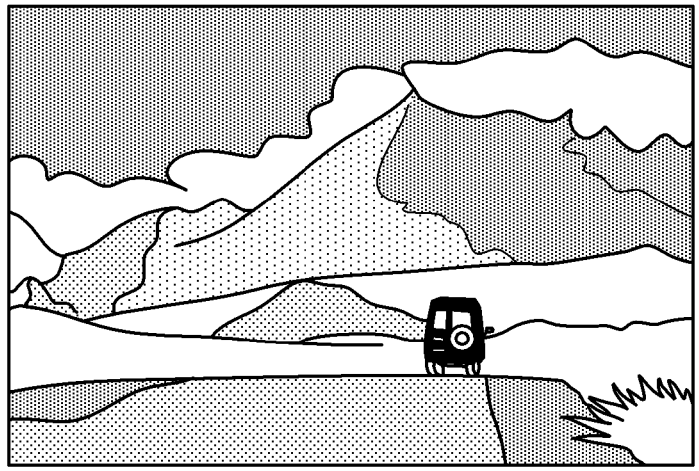
(2)
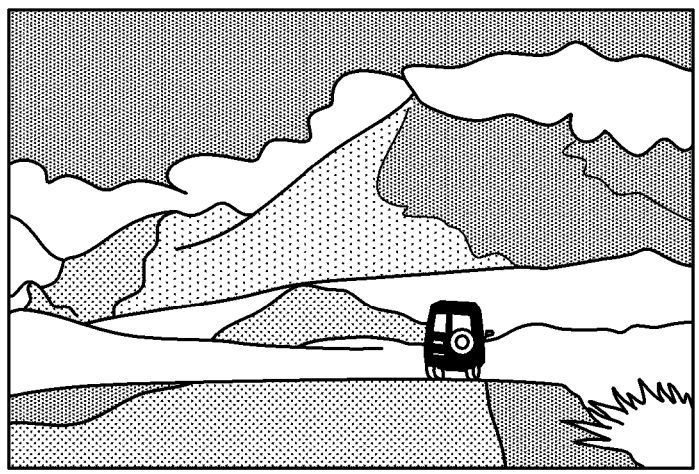

FIG.15
(1)
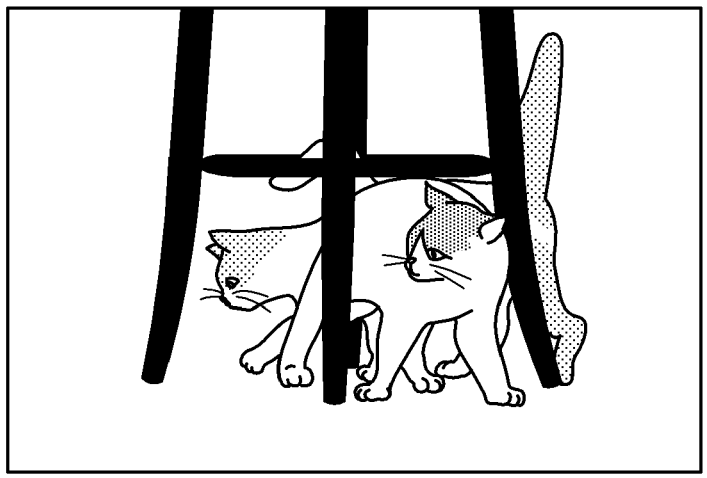
(2)
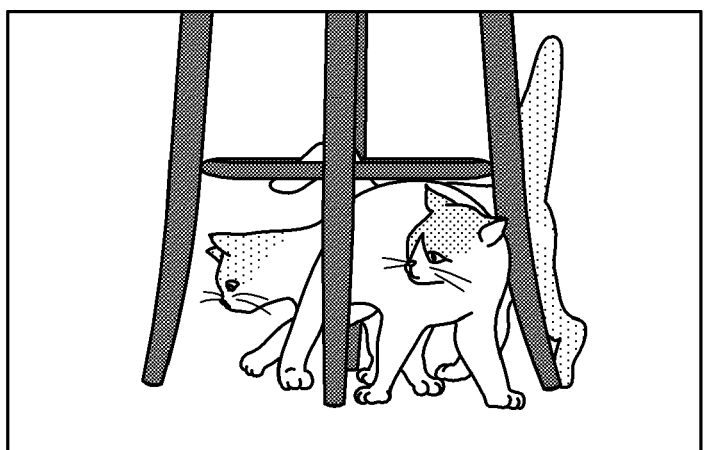

IMAGE CORRECTION APPARATUS, IMAGE CORRECTION METHOD, AND IMAGE CORRECTION PROGRAM

CROSS-REFERENCE TO RELATED APPLICATION

This application is a continuation of International Application No. PCT/JP2007/072029, filed on Nov. 13, 2007, the entire contents of which are incorporated herein by reference.

FIELD

The embodiments discussed herein are directed to image correction apparatuses that correct input images on the basis of a correction amount that is used to correct the input images and is calculated from received input images and further relates to image correction methods and image correction programs therefor.

BACKGROUND

There are image correction apparatuses that have been typically used to calculate the correction amount that is used for correcting pixel values or the like from input images, such as input moving images and still images (e.g., television images) and to correct the input images in a high quality manner using the calculated correction amount.

With such image correction apparatuses, in principle, image correction (grayscale correction) is performed to darken an input image if the input image is too bright, and to brighten an input image if the input image is too dark. However, if the image correction is simply performed in this way on the basis of the brightness of the input image, an overall bright image is corrected such that it becomes an overall dark image due to the correction in which the image is simply darkened when the image is too bright; therefore, there may be a case in which the grayscale of the dark region in the image is corrupted (or a black defacement phenomenon in which a dark image becomes darker and less viewable). For example, when correction is simply performed, using brightness, with respect to an input image that includes wrinkles of black clothes that a person wears in the daytime, the wrinkles of the black clothes that the person wears in the daytime are underexposed, resulting in a low quality image.

In contrast, for example, when grayscale is not particularly included in a dark portion, such as shadows of a tunnel in a bright scene, there may be a case in which correction is preferably performed to darken the image (image sharpening, i.e., preventing a black floating phenomenon in which the black color is perceived as the white color). In either case, because a dark region in an overall bright image is a noticeable portion in the entire image, it is undesirable that a black floating phenomenon or black defacement phenomenon occurs in such a portion.

Accordingly, various technologies for correcting images in a high quality manner while preventing occurrence of a black floating phenomenon or a black defacement phenomenon in a dark region in a bright image, which is a problem as described above, are disclosed. For example, in Japanese Laid-open Patent Publication No. 2001-189863, an image correction apparatus is disclosed, in which a correction value is calculated on the basis of the number of pixels in a dark region in a bright image. Specifically, the image correction apparatus according to Japanese Laid-open Patent Publication No. 2001-189863 detects the brightness of an input image, calculates a correction amount on the basis of the number of pixels in a comparatively dark region (from zero to a prescribed threshold) in the input image detected as a bright image, and corrects the bright input image using the calculated correction amount.

However, with the above-described conventional technology, even when the images are corrected in a high quality manner, in some cases, occurrence of a black floating phenomenon or a black defacement phenomenon may not be prevented; therefore, there is a problem in that images may not be always corrected in a high quality manner. Specifically, the correction amount is determined on the basis of the number of pixels in an extremely dark region without taking into consideration the darkness of the dark region; therefore, depending on the darkness of the dark region, correction may sometimes be suitably performed, whereas grayscale of the slightly dark region may sometimes be lost (specifically, the grayscale of the dark region may sometimes be underexposed), and furthermore, in some cases a black floating phenomenon occurs in an extremely dark region.

As described above, when correction is performed by calculating the correction value on the basis of the number of dark pixels in the entire input image, the input image is corrected such that it is simply brightened or darkened. As a result, as illustrated in (1) in FIG. 14, if correction is performed to darken the input image when a slightly dark region is present in the input image, that slightly dark region contains, as illustrated in (2) in FIG. 14, an underexposed image (a black defacement phenomenon) in which information contained in the dark region is lost. Furthermore, as illustrated in (1) in FIG. 15, if correction is performed to brighten the input image when an extremely dark region is present in the input image, in the extremely dark region, as illustrated in (2) in FIG. 15, a portion of the originally dark region becomes brightened (a black floating phenomenon).

Specifically, if the magnitude of correction is determined on the basis of the number of pixels of the dark region (i.e., a region where a pixel value is equal to or less than a prescribed value), the magnitude of correction is large when the region is broad. However, if the region contains some portions having a different degree of darkness (lots of slightly dark regions/lots of extremely dark regions), a black floating or black defacement phenomenon may possibly occur because the magnitude of correction is too large or too small for a certain portion even when the portions are contained in the same dark region.

SUMMARY

According to an aspect of an embodiment of the invention, an image correction apparatus for correcting an input image on a basis of a correction amount calculated from the input image, includes a brightness determining unit that calculates a feature value of average brightness of the input image from pixel values of pixels in the input image and determines whether the calculated feature value is equal to or greater than a first threshold; a counting unit that counts the number of pixels having a value equal to or less than a second threshold in the input image that is determined, using the brightness determining unit, to be a bright image with the feature value equal to or greater than the first threshold; an average brightness calculating unit that calculates a feature value of average brightness from pixel values of the pixels counted by the counting unit; and an image correction unit that determines the correction amount, on a basis of whether the feature value calculated by the average brightness calculating unit is equal to or greater than a third threshold or whether, from among the total number of the pixels counted by the counting unit, the number of the pixels having the value equal to or greater than the third threshold is equal to or greater than a fourth threshold, and corrects the input image using the determined correction amount.

According to another aspect of an embodiment of the invention, an image correction method for correcting an input image on a basis of a correction amount calculated from the input image, includes calculating a feature value of average brightness of the input image from pixel values of pixels in the input image and determining whether the calculated feature value is equal to or greater than a first threshold; counting the number of pixels having a value equal to or less than a second threshold in the input image that is determined, at the calculating and determining the feature value, to be a bright image with the feature value equal to or greater than the first threshold; calculating a feature value of average brightness from pixel values of the pixels counted at the counting; and determining the correction amount, on a basis of whether the feature value calculated at the calculating the feature value is equal to or greater than a third threshold or whether, from among the total number of the pixels counted at the counting, the number of the pixels having the value equal to or greater than the third threshold is equal to or greater than a fourth threshold, and correcting the input image using the determined correction amount.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 14 is a schematic diagram explaining a conventional technology; and

FIG. 15 is a schematic diagram explaining a conventional technology.

DESCRIPTION OF EMBODIMENT(S)

Preferred embodiments of the present invention will be explained with reference to accompanying drawings. In the following description, the main term used in the embodiments, the outline and features of the image correction apparatus according to the embodiments, the configuration of the image correction apparatus, and the flow of processing thereof are described in the order they are listed in this sentence. Then, various modifications of the embodiments will be described.

First Embodiment

Explanation of Term

First, the main term used in the embodiment is described. The "image correction apparatus (corresponding to an "image correction apparatus" described in the CLAIMS)" that is used in the embodiments is an apparatus that receives input images, such as moving images and still images, from an external unit or the like via a network and corrects the received input images in a high quality manner on the basis of a correction amount calculated from the received input image. The input image can be received, as well as via a network, from a computer-readable recording medium, such as a hard disk, a flexible disk (FD), a compact disk read only memory (CD-ROM), a magneto-optical (MO) disk, and a digital versatile disk (DVD).

Outline and Features of the Image Correction Apparatus

Figure 1:
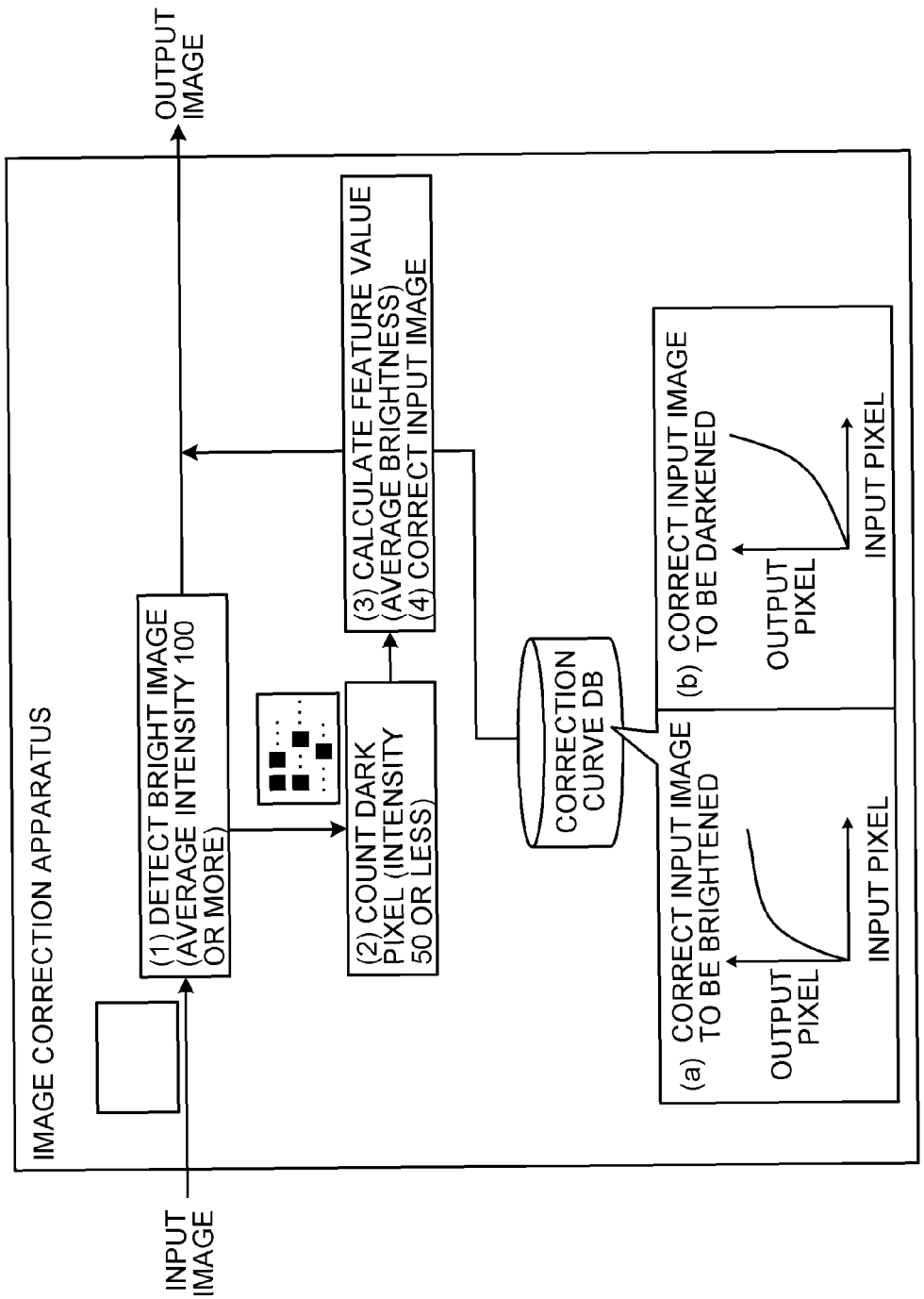
FIG. 1 is a schematic diagram explaining the outline and features of an image correction apparatus according to a first embodiment.

First, the outline and features of the image correction apparatus according to the first embodiment is described with reference to FIG. 1. FIG. 1 is a schematic diagram explaining the outline and features of the image correction apparatus according to the first embodiment.

As illustrated in FIG. 1, the "image correction apparatus" is an apparatus that receives input images, such as moving images and still images, from an external unit or the like via a network and corrects the received input images in a high quality manner on the basis of a correction amount calculated from the received input images. The input image can be received, as well as via a network, from a computer-readable recording medium, such as a hard disk, a flexible disk (FD), a compact disk read only memory (CD-ROM), a magneto-optical (MO) disk, and a digital versatile disk (DVD).

As described above, with such a configuration, in outline, the image correction apparatus corrects the input images in a high quality manner on the basis of the correction amount that is used to correct the input images and is calculated from the received input images, and, in particular, the image correction apparatus has a feature in that it can correct images in a high quality manner by preventing occurrence of a black floating phenomenon or a black defacement phenomenon.

The main features of the image correction apparatus are specifically described below. The image correction apparatus stores a plurality of correction curves that determine the correction amount in a correction curve DB. Specifically, the correction curve DB stores therein a correction curve that is used to determine the correction amount such that the input image becomes brightened (see (a) in FIG. 1) and a correction curve that is used to determine the correction amount such that the input image becomes darkened (see FIG. 1 (b)).

In such a state, the image correction apparatus calculates a feature value of average brightness of the input image from pixel values of pixels in the input image and determines whether the calculated feature value is equal to or greater than a first threshold (see (1) in FIG. 1). Specifically, when the image correction apparatus receives the input image, it obtains the pixel value of each of the pixels by referring to each of the pixels in the received input image. Then, the image correction apparatus calculates a feature value of average brightness, such as the average brightness of the pixel values of the pixels or the mode value of the brightness value and determines whether the calculated feature value is equal to or greater than a first threshold (for example, 100 or more). In the embodiment, the image correction apparatus calculates the feature value of the input image and determines whether the input image is a bright image or a dark image on the basis of whether the feature value is equal to or greater than a first threshold (for example, 100 or more). If the image correction apparatus determines that the calculated feature value is less than the first threshold (for example, less than 100) representing a dark image, the image correction apparatus outputs the input image to another device connected thereto without performing any correction.

Subsequently, for the input image determined to be a bright image with the feature value equal to or greater than the first threshold, the image correction apparatus counts the number of pixels that have a value equal to or less than a second threshold in the input image (see (2) in FIG. 1). As a specific example, if the image correction apparatus determines that the input image is a bright image, it counts the number of pixels (for example, 200) that have a value equal to or less than a second threshold (for example, pixel value of 50 or less) from among each of the pixels in the input image. In the embodiment, it is assumed that the image correction apparatus counts "200" as the number of pixels with a "pixel value of 50 or less" from among pixels in the input image.

Then, the image correction apparatus calculates a feature value of average brightness from the calculated pixel values of the pixels (see (3) in FIG. 1). Specifically, from among pixels in the input image, using the pixel values of the pixels (200) that are counted as pixels with a "pixel value of 50 or less", the image correction apparatus calculates "average brightness 40" as a feature value of average brightness, such as average brightness of the pixels with a "pixel value of 50 or less" or a mode value of a brightness value.

If the calculated feature value is equal to or greater than a third threshold, or if, from among the total number of the counted pixels, the number of pixels with a value equal to or greater than a third threshold is equal to or greater than a fourth threshold, the image correction apparatus determines the correction amount such that the input image becomes brightened. If the calculated feature value is equal to or less than the third threshold, or if, from among the total number of the counted pixels, the number of pixels with a value equal to or greater than the third threshold is less than the fourth threshold, the image correction apparatus determines the correction amount such that the input image becomes darkened. Then, the image correction apparatus corrects the input image using the determined correction amount (see (4) in FIG. 1).

Specifically, if the calculated feature value is a "feature value of 30 or more", or if, from among the total number of the counted pixels, the number of pixels with a "feature value of 30 or more" is "150 or more", the image correction apparatus determines the correction amount such that the input image becomes brightened, using the correction curve illustrated in (a) in FIG. 1 stored in the correction curve DB, corrects the input image using the determined correction amount, and then outputs the corrected image.

In contrast, if the calculated feature value is a "feature value of less than 30", or, if, from among the total number of the counted pixel, the number of pixels, with a "feature value of 30 or more" is "less than 150", the image correction apparatus determines the correction amount such that the input image becomes darkened using the correction curve illustrated in (b) in FIG. 1 stored in the correction curve DB, corrects the input image using the determined correction amount, and then outputs the corrected image.

In this way, the image correction apparatus according to the first embodiment has a feature in that it may correct the input image by calculating the correction amount using not only the number of the dark pixels in the bright image but also the feature value of the dark pixel in the bright image. As a result, the input image can be corrected to make it a high quality image by preventing occurrence of a black floating phenomenon or a black defacement phenomenon. In the following explanation, as a feature value of average brightness, a case in which average brightness is used is described as an example; however, as described above, it is not limited to average brightness. The mode value of a brightness value may be used.

Configuration of the Image Correction Apparatus

Figure 2:
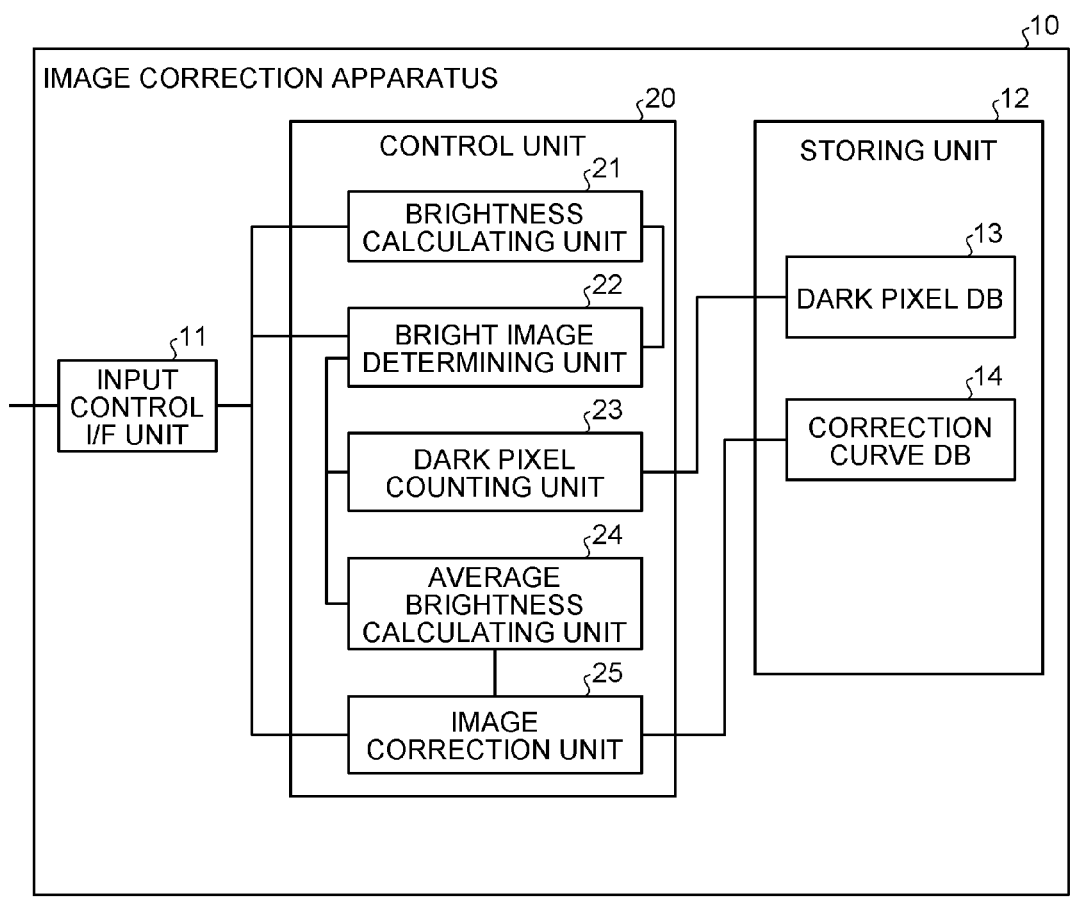
FIG. 2 is a block diagram illustrating the configuration of the image correction apparatus according to the first embodiment.

In the following, the configuration of the image correction apparatus illustrated in FIG. 1 is described with reference to FIG. 2. FIG. 2 is a block diagram illustrating the configuration of the image correction apparatus according to the first embodiment. As illustrated in FIG. 2, an image correction apparatus 10 includes an input control I/F unit 11, a storing unit 12, and a control unit 20.

The input control I/F unit 11 receives images such as moving images and still images frame by frame or outputs images to a device connected thereto. Specifically, the input control I/F unit 11 is connected to a brightness calculating unit 21, a bright image determining unit 22, and an image correction unit 25. The input control I/F unit 11 receives the images, such as moving images and the still images, that are received by the image correction apparatus 10 frame by frame and outputs images that are corrected by a device connected thereto. Furthermore, the input control I/F unit 11 receives the images, as well as via a network, from a computer-readable recording medium, such as a hard disk, a flexible disk (FD), a CD-ROM, an MO, and a DVD.

The storing unit 12 stores therein data and programs required for various processes performed by the control unit 20. The storing unit 12 includes a dark pixel DB 13 and a correction curve DB 14, which are particularly and closely related to the present invention.

The dark pixel DB 13 stores therein pixels counted by a later-described dark pixel counting unit 23 and pixel values of the pixels in an associated manner. Specifically, the dark pixel DB 13 stores therein a plurality of pixels counted by the later-described dark pixel counting unit 23 and pixel values of the plurality of the calculated pixels in an associated manner.

Figure 3:
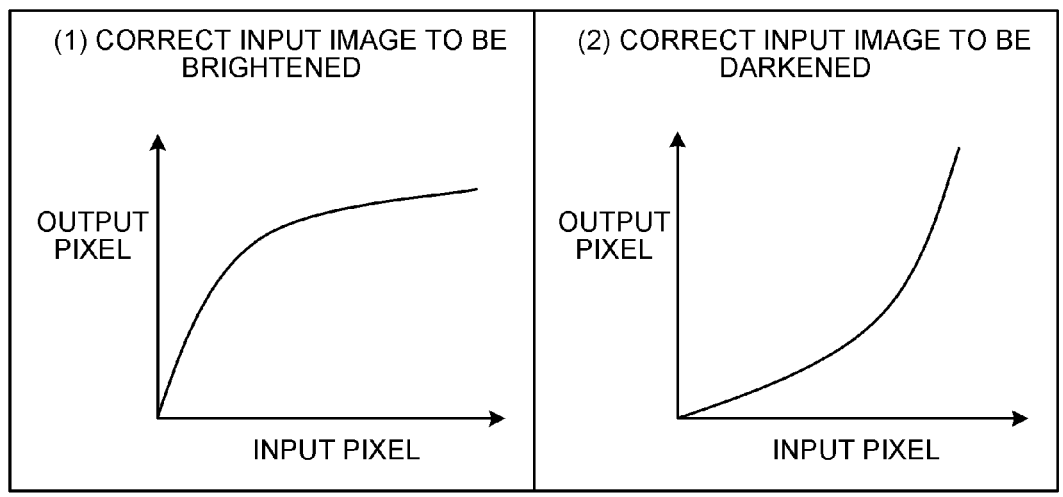
FIG. 3 is a schematic diagram illustrating examples of information stored in a correction curve DB.

The correction curve DB 14 stores therein a plurality of correction curves in which input pixels that are used to determine the correction amount are associated with converted output pixels. Specifically, to brighten the input image, the correction curve DB 14 stores therein a correction curve in which input pixels are associated with output pixels that are brighter than the input pixels (see (1) in FIG. 3); and to darken the input image, the correction curve DB 14 stores therein a correction curve in which the input pixels are associated with output pixels that are darker than the input pixels (see (2) in FIG. 3). FIG. 3 is a schematic diagram illustrating examples of information stored in the correction curve DB 14.

The control unit 20 has an internal memory for storing therein a control program such as an operating system (OS), necessary data and programs prescribing various kinds of procedures. The control unit 20 also includes, in particular, as closely related to the present invention, the brightness calculating unit 21, the bright image determining unit 22, the dark pixel counting unit 23, an average brightness calculating unit 24, and the image correction unit 25, which execute various kinds of processes.

The brightness calculating unit 21 calculates average brightness of the input image from the pixel values of the pixels in the input image. Specifically, when the input control I/F unit 11 receives the input image, the brightness calculating unit 21 obtains the pixel values of the pixels by referring to each of the pixels in the received input image. Then, the brightness calculating unit 21 calculates the average value of the obtained pixel values of the pixels as average brightness "200" and outputs the calculated average brightness "200" to the bright image determining unit 22. For example, if the input image includes five million pixels, the brightness calculating unit 21 calculates an average pixel value by referring to the five million pixels.

The bright image determining unit 22 determines whether the average brightness calculated by the brightness calculating unit 21 is equal to or greater than the first threshold. Specifically, the bright image determining unit 22 determines whether the average brightness "200" of the input image received from the brightness calculating unit 21 is equal to or greater than the first threshold (for example, 100). Then, if the bright image determining unit 22 determines that the average brightness "200" of the input image is equal to or greater than the first threshold (for example, 100 or more), the bright image determining unit 22 outputs the input image to the dark pixel counting unit 23, whereas if it determines that the average brightness "200" of the input image is less than the first threshold (for example, less than 100), it outputs the input image to the input control I/F unit 11. In other words, the bright image determining unit 22 determines whether the input image is a bright image using the average brightness and outputs only the input image that is determined to be the bright image to the dark pixel counting unit 23.

For the input image that is determined to be a bright image with the average brightness equal to or greater than the first threshold by the bright image determining unit 22, the dark pixel counting unit 23 counts the number of pixels that have a value equal to or less than the second threshold in the input image. Specifically, if the bright image determining unit 22 receives the input image that is determined to be a bright image, the dark pixel counting unit 23 counts, from among each of the pixels in the input image, the number of pixels (for example, 200) that have a value equal to or less than the second threshold (for example, a pixel value of 50 or less), associates the counted pixels with the pixel values of the pixels, and stores them in the dark pixel DB 13.

The average brightness calculating unit 24 calculates the average brightness from the pixel values of the pixels counted by the dark pixel counting unit 23. Specifically, when the dark pixel counting unit 23 counts dark pixels and stores them in the dark pixel DB 13, using the pixel values of the pixels (200) stored in the dark pixel DB 13, the average brightness calculating unit 24 calculates average brightness (for example, average brightness 40) of the pixels that have a value equal to or less than the second threshold (for example, pixel value of 50 or less) and outputs the calculated average brightness (for example, average brightness 40) to the image correction unit 25.

If the average brightness calculated by the average brightness calculating unit 24 is equal to or greater than the third threshold, or if, from among the total number of the counted pixels, the number of pixels with a value equal to or greater than the third threshold is equal to or greater than the fourth threshold, the image correction unit 25 determines the correction amount such that the input image becomes brightened. If the calculated average brightness is less than the third threshold, or if, from among the total number of the counted pixels, the number of pixels with a value equal to or greater than the third threshold is less than the fourth threshold, the image correction unit 25 determines the correction amount such that the input image becomes darkened and corrects the input image using the determined correction amount.

In addition to the examples described above, a specific example of each of the thresholds is described below. If the average brightness (average brightness 40) calculated by the average brightness calculating unit 24 is "average brightness of 30 or more", or if, from among the total number of (200) counted pixels, the number of pixels with "average brightness 30 or more" is "150 or more", the image correction unit 25 determines the correction amount such that the input image becomes brightened using the correction curve, illustrated (a) in FIG. 1, stored in the correction curve DB 14, corrects the input image using the determined correction amount, and outputs it. Specifically, the image correction apparatus 10 determines a correction amount such that the input image becomes brightened if the average brightness calculated by counting the dark pixels with a value equal to or less than the second threshold (for example, 50 or less) is equal to or greater than the threshold, or if, regardless of the average brightness of the counted dark pixels, the input image includes a relatively large number of dark pixels that have a value equal to or less than the second threshold (for example, 50 or less).

In contrast, if the average brightness calculated by the average brightness calculating unit 24 is "less than average brightness 30", or if, from among the total number of (200) counted pixels, the number of pixels with "average brightness 30 or more" is "less than 150", the image correction unit 25 determines the correction amount such that the input image becomes darkened, using the correction curve illustrated in (b) in FIG. 1 stored in the correction curve DB 14, corrects the input image using the determined correction amount, and outputs it. Specifically, the image correction apparatus 10 determines a correction amount such that the input image becomes darkened if the average brightness calculated by counting the dark pixels with a value equal to or less than the second threshold (for example, 50 or less) is equal to or less than the threshold, or if, regardless of the average brightness of the counted dark pixels, the input image includes a small number of (few in number) dark pixels that have a value equal to or less than the second threshold (for example, 50 or less).

Processing Performed by the Image Correction Apparatus

Figure 4:
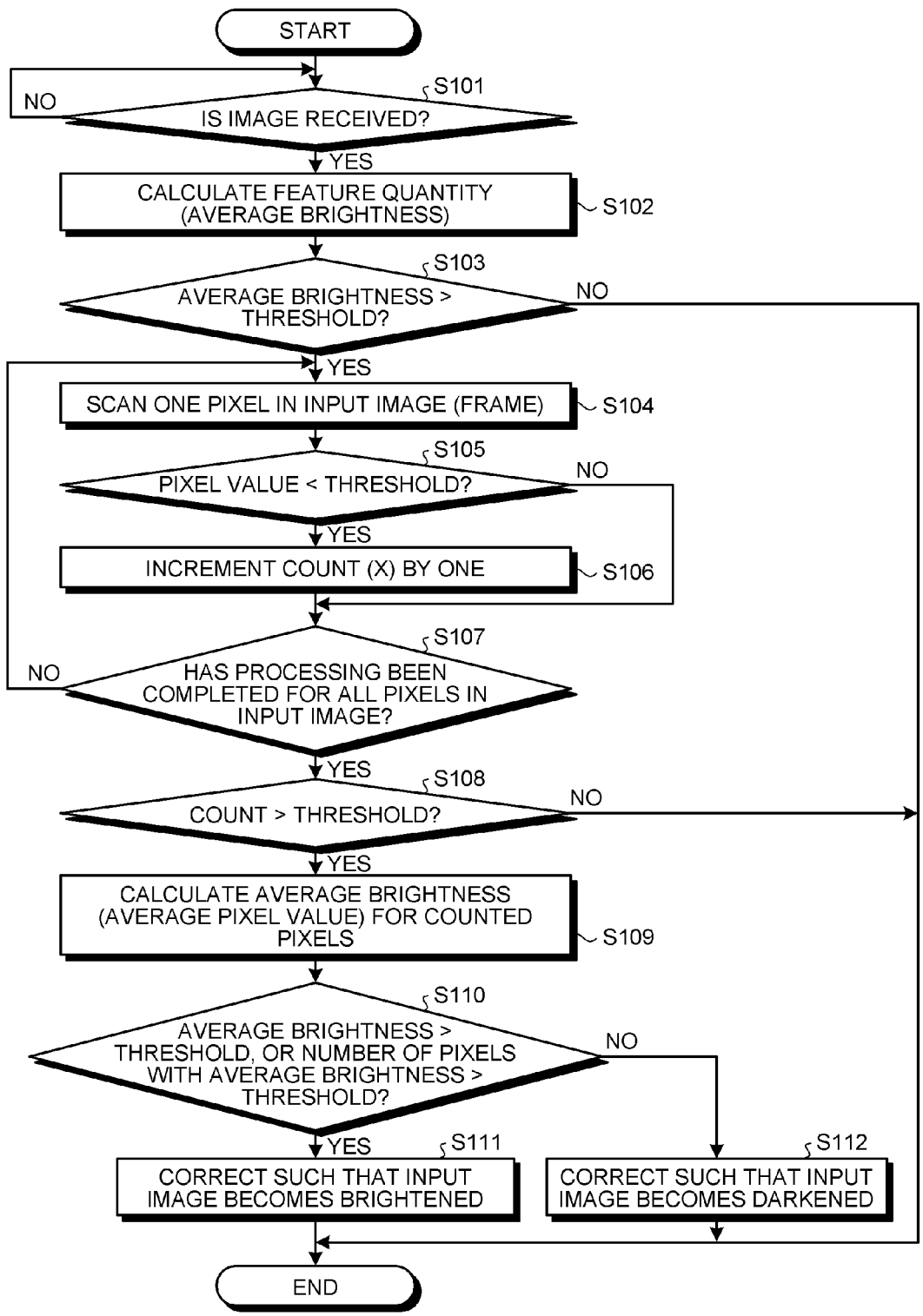
FIG. 4 is a flowchart illustrating the flow of image correction processing performed by the image correction apparatus according to the first embodiment.

In the following, processing performed by the image correction apparatus is described with reference to FIG. 4. FIG. 4 is a flowchart illustrating the flow of image correction processing performed by the image correction apparatus according to the first embodiment.

As illustrated in FIG. 4, after receiving the input image (Yes at Step S101), the image correction apparatus 10 calculates the average brightness as a feature quantity of the input image (Step S102) and determines whether the average brightness is equal to or greater than the threshold (Step S103).

Specifically, when the input control I/F unit 11 receives the input image, the brightness calculating unit 21 calculates the average brightness of the input image from the pixel values of pixels in the input image and outputs the average brightness of the input image to the bright image determining unit 22. The bright image determining unit 22 determines whether the average brightness calculated by the brightness calculating unit 21 is equal to or greater than the threshold (for example, 100 or more), i.e., determines whether the input image is a bright image.

Then, if the bright image determining unit 22 determines that the average brightness calculated by the brightness calculating unit 21 is equal to or greater than the threshold (for example, 100 or more) (Yes at Step S103), the image correction apparatus 10 scans one single pixel in the input image (Step S104) and determines whether the pixel value of the scanned pixel is lower than the threshold (Step S105).

Specifically, if the bright image determining unit 22 determines that the average brightness calculated by the brightness calculating unit 21 is equal to or greater than the threshold (for example, 100 or more), the dark pixel counting unit 23 scans a single pixel in the input image received by the input control I/F unit 11, and determines whether the pixel value of the scanned pixel is lower than the threshold (for example, 50), i.e., determines whether the scanned pixel is a dark pixel.

Subsequently, if the image correction apparatus 10 determines that the pixel value of the scanned pixel is lower than the threshold (for example, 50), i.e., a dark pixel (Yes at Step S105), the image correction apparatus 10 increments a count for counting the number of dark pixels by one (Step S106) and determines whether processing of Steps S104 to S106 has been executed for all pixels in the input image (Step S107). In contrast, if the image correction apparatus 10 determines that the pixel value of the scanned pixel is greater than the threshold (for example, 50), i.e., a bright pixel (No at Step S105), the image correction apparatus 10 determines whether the processing of Steps S104 to S106 has been executed for all pixels in the input image without incrementing the count (Step S107).

Specifically, from all pixels in the input image corresponding to the input bright image, the dark pixel counting unit 23 counts the number of dark pixels with a value equal to or less than the threshold (for example, 50), associates the pixels with the pixel values of one of the corresponding pixels, and stores them in the dark pixel DB 13.

Then, if the processing of Steps S104 to S106 has been completed for all pixels in the input image (Yes at Step S107), the image correction apparatus 10 determines whether the counted count is equal to or greater than the threshold (Step S108), and if the counted count is greater than the threshold (Yes at Step S108), the image correction apparatus 10 calculates the average brightness of the counted pixels (Step S109).

Specifically, when the processing of Steps S104 to S106 has been completed for all the pixels in the input image, the average brightness calculating unit 24 calculates the average brightness (for example, average brightness 40) of the pixels that have a value equal to or less than the second threshold (for example, pixel value of 50 or less) using the pixel values of the pixels (200) stored in the dark pixel DB 13 and outputs the calculated average brightness (for example, average brightness 40) to the image correction unit 25.

Then, if the calculated average brightness is greater than the threshold, or if, from among the total number of the counted pixels, the number of pixels with the brightness equal to or greater than the calculated average brightness is equal to or greater than the threshold (Yes at Step S110), the image correction apparatus 10 determines the correction amount such that the image becomes brightened and corrects the image (Step S111). If the calculated average brightness is lower than the threshold, or if, from among the total number of the counted pixels, the number of pixels with brightness greater than the calculated average brightness is less than the threshold (No at Step S110), the image correction apparatus 10 determines the correction amount such that the image becomes darkened and corrects the image (Step S112).

Specifically, if the average brightness (average brightness 40) calculated by the average brightness calculating unit 24 is "average brightness 30 or more", or if, from among the total number of the counted pixels (200), the number of pixels with the "average brightness 30 or more" is "150 or more", the image correction unit 25 determines the correction amount such that the input image becomes brightened, using the correction curve, illustrated in (A) in FIG. 1 and stored in the correction curve DB 14, corrects the input image using the determined correction amount, and outputs the corrected image to the input control I/F unit 11.

In contrast, if the average brightness calculated by the average brightness calculating unit 24 is "less than the average brightness 30", or if, from among the total number of the counted pixels (200), the number of pixels with the "average brightness 30 or more" is "less than 150", the image correction unit 25 determines the correction amount such that the input image becomes darkened, using the correction curve, illustrated in the schematic diagram (B) in FIG. 1 and stored in the correction curve DB 14, corrects the input image using the determined correction amount, and then outputs the corrected image.

At Step S103, if the image correction apparatus 10 determines that the average brightness calculated by the brightness calculating unit 21 is less than the threshold (for example, 100) (No at Step S103), or, at Step S108, if the image correction apparatus 10 determines that the counted count is lower than the threshold (No at Step S108), the image correction apparatus 10 ends its processing.

Advantage of the First Embodiment

As described above, according to the first embodiment, the image correction apparatus 10 calculates the average brightness of the input image from the pixel values of pixels in the input image and determines whether the calculated average brightness is equal to or greater than the first threshold. For the input image that is determined to be a bright image with the average brightness equal to or greater than the first threshold, the image correction apparatus 10 counts the number of pixels that have a value equal to or less than the second threshold in the input image. From among the pixel values of the counted pixels, the image correction apparatus 10 calculates the average brightness. On the basis of whether the calculated average brightness is greater than the third threshold, or on the basis of whether the number of pixels, from among the total number of the counted pixels, with a value equal to or greater than the third threshold is equal to or greater than the fourth threshold, the image correction apparatus 10 determines the correction amount and corrects the input image using the determined correction amount. As a result, it is possible to correct images in a high quality manner by preventing occurrence of a black floating phenomenon or a black defacement phenomenon.

For example, instead of the number of dark pixels in the bright image, the correction amount is calculated using the average brightness of the dark pixels in the bright image; therefore, it is possible to prevent a black defacement phenomenon in which grayscale in a slightly dark region is underexposed and also to perform correction in which a black floating phenomenon in an extremely dark region is prevented. As a result, it is possible to suitably correct a dark region in a bright image, which is a noticeable portion in the entire image. Furthermore, correction is not limited to input images under the fluctuated shooting conditions or the like; it is possible to correct unspecified images such as television images in a similar manner. As a result, stable image correction may be performed, independently of input images.

Moreover, according to the first embodiment, if the calculated average brightness is equal to or greater than the third threshold, or if, from among the total number of the counted pixels, the number of pixels with a value equal to or greater than the third threshold is equal to or greater than the fourth threshold, the correction amount is determined such that the input image becomes brightened. If the calculated average brightness is less than the third threshold, or if, from among the total number of the counted pixels, the number of pixels with a value equal to or greater than the third threshold is less than the fourth threshold, the correction amount is determined such that the input image becomes darkened. Then, the input image is corrected using the determined correction amount; therefore, it is possible to perform suitable correction by further preventing occurrence of a black floating phenomenon or a black defacement phenomenon.

For example, the correction amounts are each determined according to a slightly dark image in a bright image in which average brightness of the dark pixels is equal to or greater than the third threshold (for example, 20) and an extremely dark image in the bright image in which average brightness is less than the third threshold. Thus, it is possible to perform suitable image correction in which a black defacement phenomenon, i.e., grayscale in a slightly dark region is underexposed, and a black floating phenomenon in the extremely dark region are reliably prevented.

[b ]Second Embodiment

In the first embodiment, explanation is made of a case where the correction amount is determined from the average brightness of the dark pixels detected in the input image representing a bright image that have a value equal to or greater than a prescribed threshold; however, the present invention is not limited thereto. For example, dark regions are detected in an input image representing a bright image that have a value equal to or greater than a prescribed threshold, and then a correction amount may be determined from the average brightness of the detected dark regions.

Figure 5:
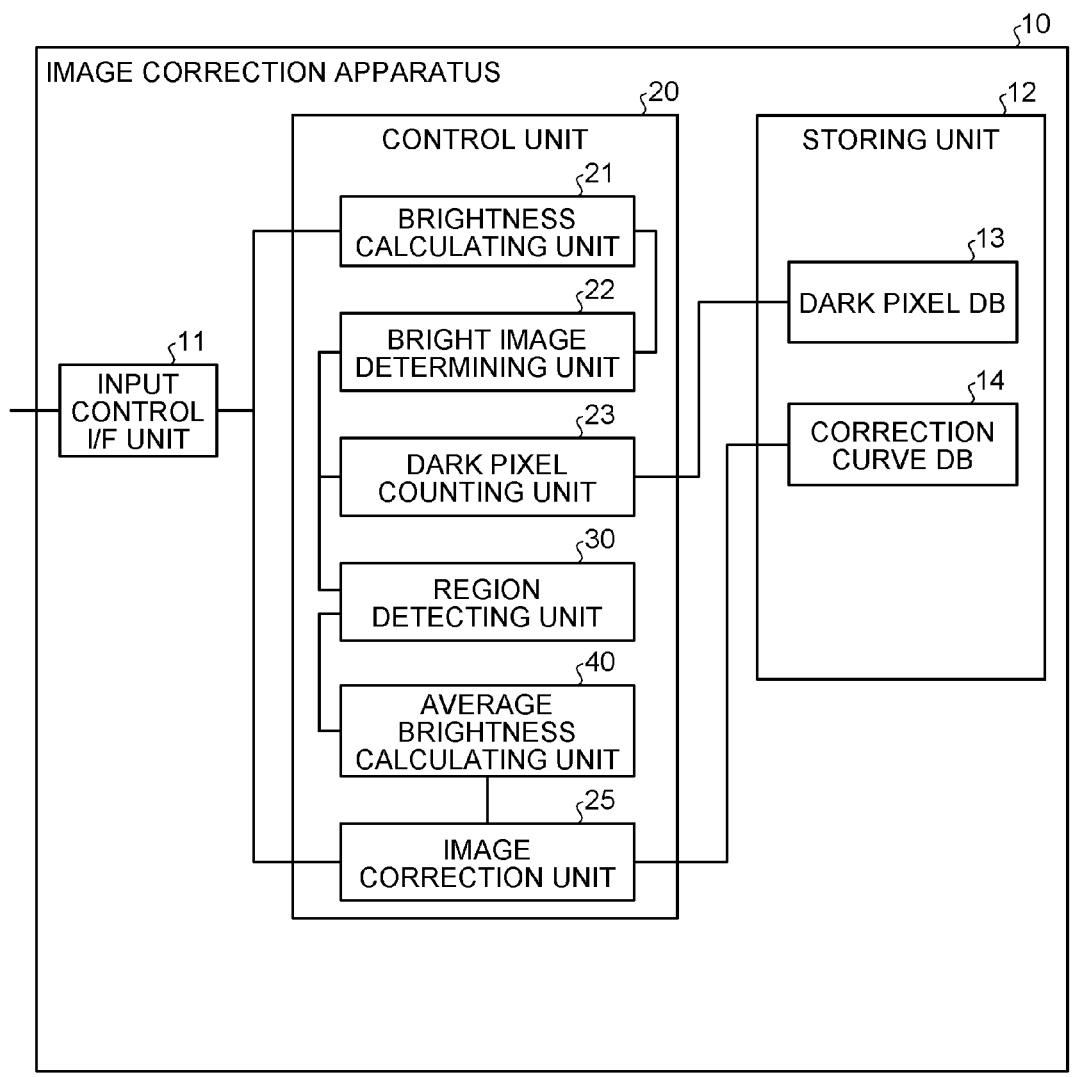
FIG. 5 is a block diagram illustrating an image correction apparatus according to a second embodiment.

Accordingly, in a second embodiment, a case is described with reference to FIGS. 5 to 7, in which dark regions are detected from an input image, which is a bright image with a value equal to or greater than a prescribed threshold and then a correction amount is determined from average brightness of the detected dark regions.

Configuration of the Image Correction Apparatus (Second Embodiment)

First, the configuration of an image correction apparatus according to the second embodiment is described with reference to FIG. 5. FIG. 5 is a block diagram illustrating the image correction apparatus according to the second embodiment. As illustrated in FIG. 5, the image correction apparatus 10 includes the input control I/F unit 11, the storing unit 12, and the control unit 20. Among these components, the input control I/F unit 11, the storing unit 12, and the control unit 20 including the brightness calculating unit 21, the bright image determining unit 22, the dark pixel counting unit 23, and the image correction unit 25 have the same functions as those described in the first embodiment illustrated in FIG. 2; therefore, detailed descriptions thereof are not repeated. In the second embodiment, a description is given for a region detecting unit 30 and an average brightness calculating unit 40, which have different functions from those in the first embodiment.

For an input image determined, using the bright image determining unit 22, to be a bright image with average brightness equal to or greater than the first threshold, the region detecting unit 30 detects regions in which pixels with a value equal to or less than the second threshold are continuously present by referring to each of the pixels in the input image. Specifically, for an input image determined, using the bright image determining unit 22, to be a bright image in which average brightness is equal to or greater than the first threshold, the region detecting unit 30 detects pixels with a value equal to or less than the second threshold by referring to each of the pixels in the input image. Then, for N pixels located around the detected dark pixel (target pixel) with a value equal to or less than the second threshold, the region detecting unit 30 detects dark regions by detecting pixels with a value equal to or less than the second threshold and outputs the detected region information to the average brightness calculating unit 40.

Figure 6:
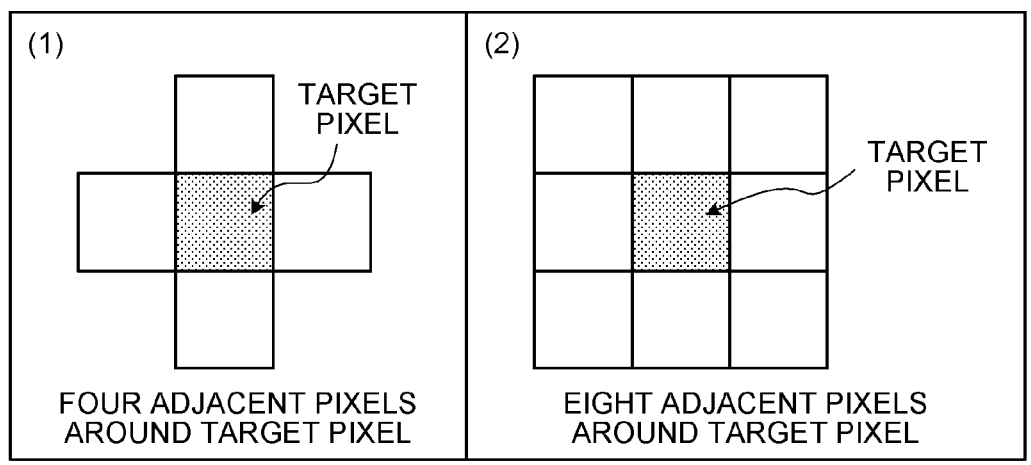
FIG. 6 is a schematic diagram illustrating examples of calculating a dark region.

For example, as illustrated in (1) in FIG. 6, for four adjacent pixels around the detected dark pixel (target pixel) having a value equal to or less than the second threshold, the region detecting unit 30 can be configured to detect the dark region by detecting pixels with a value equal to or less than the second threshold. Alternatively, as illustrated in (2) in FIG. 6, for eight adjacent pixels around the detected dark pixel (target pixel) with the value equal to or less than the second threshold, the region detecting unit 30 can be configured to detect the dark region by detecting pixels with a value equal to or less than the second threshold. FIG. 6 is a schematic diagram illustrating examples of calculating a dark region.

The average brightness calculating unit 40 calculates average brightness of regions from pixel values of the pixels in the regions detected by the region detecting unit 30. Specifically, for a plurality of regions detected by the region detecting unit 30, the average brightness calculating unit 40 calculates average brightness of the regions from the pixel values of the pixels in the regions. Then, the average brightness calculating unit 40 calculates average brightness of the average brightness for each calculated region and outputs it to the image correction unit 25 as average brightness for the entire image. For example, when four regions are detected by the region detecting unit 30, the average brightness calculating unit 40 calculates average brightness of each of four regions. Then, the average brightness calculating unit 40 calculates an average of the calculated four average brightness values and outputs it to the image correction unit 25 as the average brightness for the entire image.

Processing Performed by the Image Correction Apparatus (Second Embodiment)

In the following, processing performed by the image correction apparatus is described with reference to FIG. 7. FIG. 7 is a flowchart illustrating the flow of image correction processing performed by the image correction apparatus according to the second embodiment.

Figure 7:
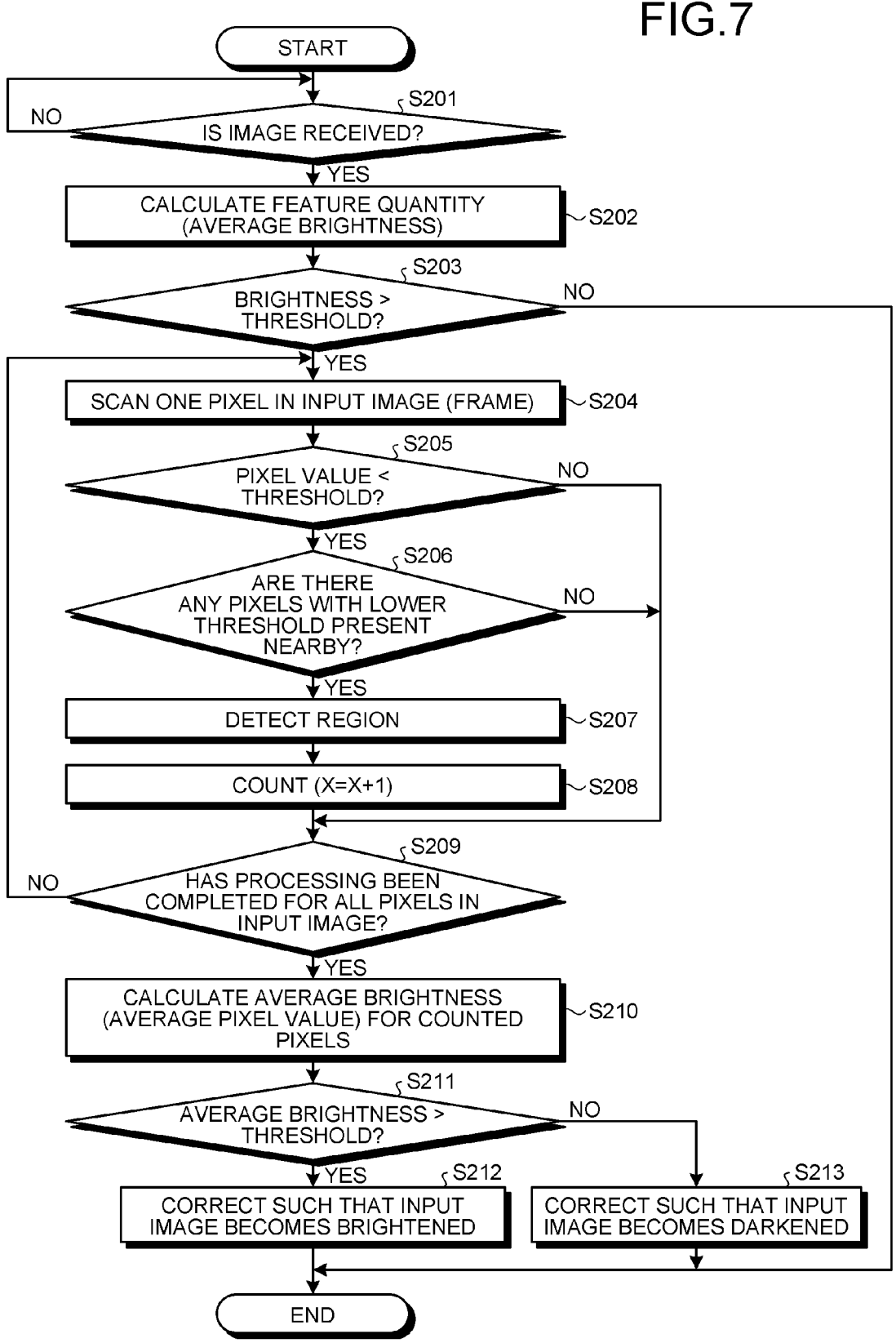
FIG. 7 is a flowchart illustrating the flow of image correction processing performed by the image correction apparatus according to the second embodiment.

As illustrated in FIG. 7, in a similar manner as in the first embodiment, after receiving the input image (Yes at Step S201), the image correction apparatus 10 calculates the average brightness as a feature quantity of the input image (Step S202) and determines whether the average brightness is equal to or greater than the threshold (Step S203).

If the image correction apparatus 10 determines that the calculated average brightness is equal to or greater than the threshold (for example, 100) (Yes at Step S203), the image correction apparatus 10 scans one single pixel in the input image (Step S204) and determines whether the pixel value of the scanned pixel is lower than the threshold (Step S205).

Subsequently, unlike the first embodiment, if the image correction apparatus 10 determines that the pixel value of the scanned pixel is lower than the threshold representing a dark pixel (for example, 50), i.e., (Yes at Step S205), the image correction apparatus 10 determines whether pixels with lower threshold are present around the determined dark pixel (Step S206). If the image correction apparatus 10 determines that pixels with a lower threshold are present around the dark pixel (Yes at Step S206), the image correction apparatus 10 detects the region (Step S207), and increments a count by one (Step S208). In contrast, if the image correction apparatus 10 determines that the pixel value of the scanned pixel is not lower than the threshold representing not being a dark pixel (for example, 50), i.e., (No at Step S205), or, determines that pixels with a lower threshold are not present around the dark pixel (No at Step S206), the later described processing of Step S209 is performed.

Specifically, for four adjacent pixels or eight adjacent pixels around the dark pixel (target pixel) with a value that is equal to or less than the second threshold detected by the dark pixel counting unit 23, the region detecting unit 30 detects the dark region by detecting pixels with a value equal to or less than the second threshold and increments a count indicating detection of a dark region.

When processing of Steps S204 to S208 has been completed for all pixels in the input image (Yes at Step S209), the image correction apparatus 10 calculates the average brightness of the counted region (Step S210). If the calculated average brightness is greater than the threshold (Yes at Step S211), the image correction apparatus 10 corrects the input image to be brightened (Step S212), and if the calculated average brightness is lower than the threshold (No at Step S211), the image correction apparatus 10 corrects the input image to be darkened (Step S213).

Specifically, for the plurality of regions detected by the region detecting unit 30, the average brightness calculating unit 40 calculates the average brightness of the regions from the pixel values of the pixels in the regions, calculates average brightness of the entire image from the average brightness for each calculated region, and then outputs it to the image correction unit 25 as the average brightness of the entire image. Subsequently, if the average brightness calculated by the average brightness calculating unit 40 is "equal to or greater than the threshold", the image correction unit 25 determines the correction amount such that the input image becomes brightened using the correction curve stored in the correction curve DB 14. If the average brightness calculated by the average brightness calculating unit 40 is "less than the threshold", the image correction unit 25 determines the correction amount such that the input image becomes darkened using the correction curve stored in the correction curve DB 14. Thereafter, the image correction unit 25 corrects the input image using the determined correction amount and outputs the corrected input image to the input control I/F unit 11.

Referring back to Step S209, if processing of Steps S204 to S208 has not been completed for all pixels in the input image (No at Step S209), the image correction apparatus 10 returns its processing to Step S204 to repeat the processing of Steps S204 to S208. At Step S203, if the average brightness calculated by the brightness calculating unit 21 is less than the threshold (No at Step S203), the image correction apparatus 10 ends the processing.

Advantage of the Second Embodiment

As described above, according to the second embodiment, for the input image determined to be a bright image with average brightness equal to or greater than the first threshold, the image correction apparatus 10 calculates, by referring to each of the pixels in the input image, regions in which pixels with a value equal to or less than the second threshold are continuously present. The image correction apparatus 10 calculates average brightness of the regions from the pixel values of the pixels in the calculated regions, determines the correction amount on the basis of whether the average brightness of the calculated regions is equal to or greater than the third threshold, and corrects the input image using the determined correction amount. Accordingly, the correction amount can be determined by targeting a dark portion (region) in the input image, instead of dark pixels in the entire input image. As a result, compared with a case in which the correction amount is determined from the dark pixels in the entire input image, it is possible to correct images in a high quality manner by preventing occurrence of a black floating phenomenon or a black defacement phenomenon.

[c] Third Embodiment

In the second embodiment, a case has been mentioned in which the correction amount is determined from the average brightness of the detected dark regions; however, the present invention is not limited thereto. For example, the correction amount can be determined from the size (magnitude) of the detected dark regions.

Accordingly, in a third embodiment, a case in which dark regions are detected from an input image, which is a bright image with a value equal to or greater than a prescribed threshold, and a correction amount is determined from the size (magnitude) of the detected dark regions is described with reference to FIG. 8.

Processing Performed by the Image Correction Apparatus (Third Embodiment)

In the third embodiment, processing performed by the image correction apparatus is described with reference to FIG. 8. FIG. 8 is a flowchart illustrating the flow of image correction processing performed by the image correction apparatus according to the third embodiment.

Figure 8:
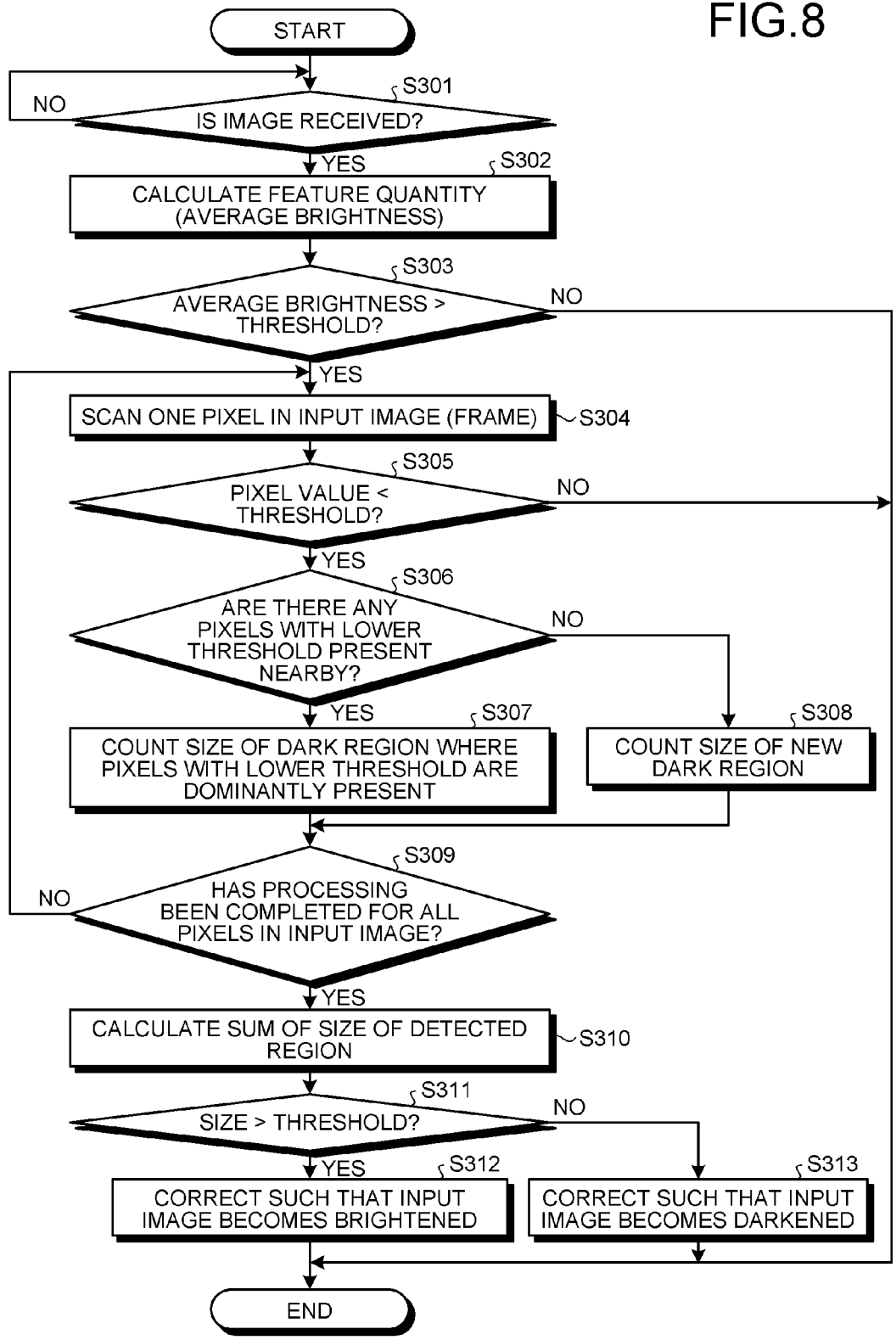
FIG. 8 is a flowchart illustrating the flow of image correction processing performed by an image correction apparatus according to a third embodiment.

As illustrated in FIG. 8, processing of Steps S301 to S309 is the same as that of Steps S201 to S209 described in the second embodiment with reference to FIG. 7; therefore, detailed explanation is not repeated here.

If processing of Steps S304 to S308 has been completed for all pixels in the input image (Yes at Step S309), the image correction apparatus 10 calculates the sum of the size of the counted regions (Step S310). If the size of the calculated regions is greater than a threshold (Yes at Step S311), the image correction apparatus 10 corrects the input image to be brightened (Step S312); whereas if the size of the calculated regions is lower than the threshold (No at Step S311), the image correction apparatus 10 corrects the input image to be darkened (Step S313).

Specifically, the average brightness calculating unit 40 sums the size of the plurality of the regions calculated by the region detecting unit 30 to calculate the size of the dark regions in the entire input image and outputs the calculated size of the regions to the image correction unit 25. Then, if the size of the regions calculated by the average brightness calculating unit 40 is "equal to or greater than the threshold", the image correction unit 25 determines the correction amount such that the input image becomes brightened using the correction curves stored in the correction curve DB 14. If the size of the regions calculated by the average brightness calculating unit 40 is "less than the threshold", the image correction unit 25 determines the correction amount such that the input image becomes darkened using the correction curves stored in the correction curve DB 14. The image correction unit 25 corrects the input image using the determined correction amount and outputs the corrected image to the input control I/F unit 11. The size of the regions can be determined using, for example, the coordinate value of the detected dark pixels in the entire input image.

Advantage of the Third Embodiment

As described above, according to the third embodiment, if the size of the calculated regions is equal to or greater than the threshold, the correction amount is determined on the basis of whether the average brightness of the calculated regions is equal to or greater than the threshold, and the input image is corrected using the determined correction amount. Accordingly, it is possible to correct only a large (broad) dark portion (region), which is noticeable by the human eye, other than a small (narrow) dark portion (region), which is a noise level that is not noticeable by the human eye.

[d]Fourth Embodiment

In the first, second, and third embodiments, a case in which the input image is corrected using two types of correction curves is described: a correction curve that is used to brighten the input image and a correction curve that is used to darken the input image. However, the present invention is not limited thereto. For example, it is possible to correct the input image by storing, in advance, a plurality of correction curves associated with the average brightness of the dark pixels in the input image (or, dark pixels in the region) and using a correction curve associated with the calculated average brightness.

In a fourth embodiment, a case in which a plurality of correction curves associated with the average brightness of the dark pixels in the input image (or, the dark pixels in the region) is stored in advance, and the input image is corrected using a correction curve associated with the calculated average brightness is described, with reference to FIGS. 9 to 12.

Figure 9:
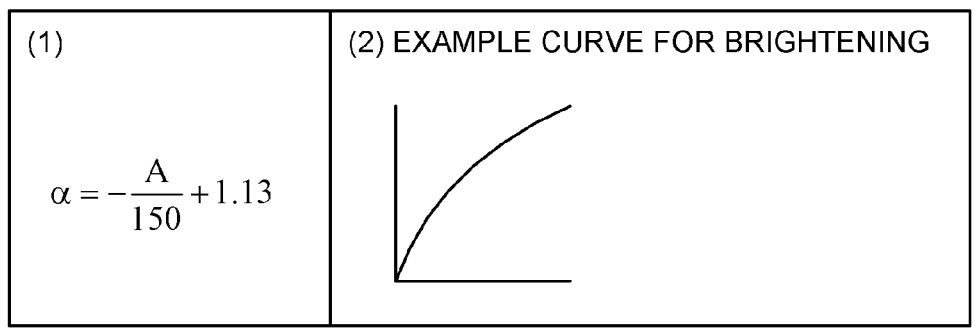
FIG. 9 is a schematic diagram illustrating an example of calculating a correction curve.
Figure 10:
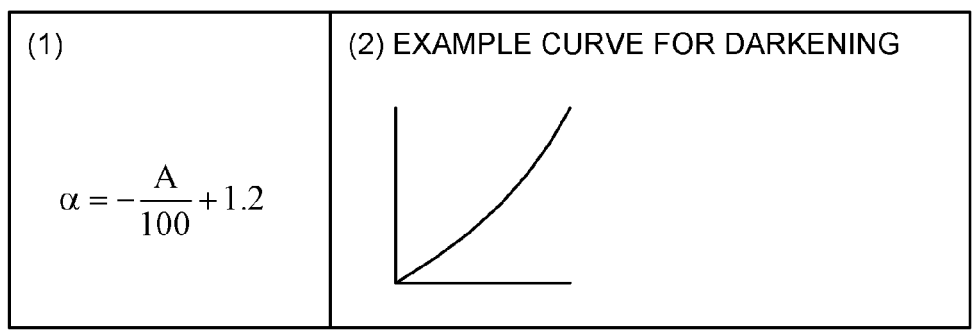
FIG. 10 is a schematic diagram illustrating an example of calculating a correction curve.

First, creation of the correction curves is described with reference to FIGS. 9 and 10. Correction curves can be represented as an exponential function "y=x$^\alpha$", where "y" represents a pixel value after correction, "x" represents a pixel value before correction, and "$\alpha$" represents the calculated average brightness. FIGS. 9 and 10 are schematic diagrams illustrating examples of calculating correction curves.

For example, if the average brightness of the dark region A>20 is slightly dark, "$\alpha=-A/150+1.13$" is given as illustrated in (1) in FIG. 9. When a pixel value is calculated by substituting $\alpha$ to the above-described exponential function, the correction curve like that illustrated in (2) in FIG. 9 can be created. Furthermore, for example, if the average brightness of the dark region A<=20 is extremely dark, "$\alpha=-A/100+1.2$" is given as illustrated in (1) in FIG. 10. When a pixel value is calculated by substituting $\alpha$ to the above-described exponential function, a correction curve like that illustrated in (2) in FIG. 10 can be created.

Figures 11, 12:
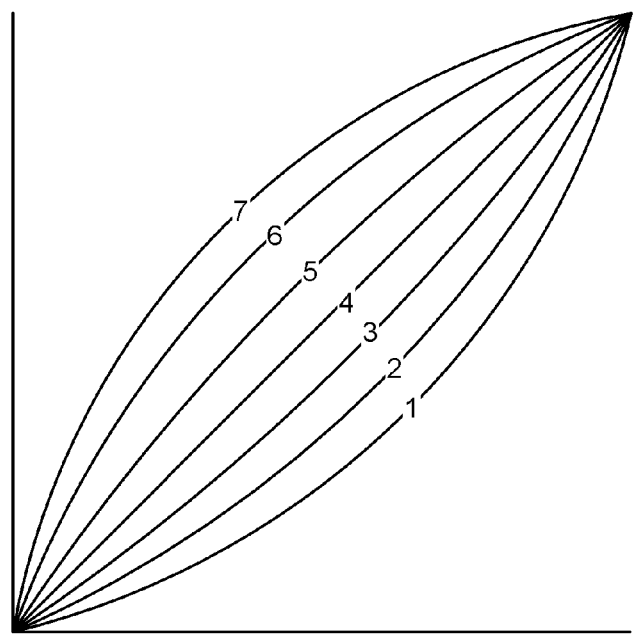
FIG. 11 is a schematic diagram illustrating an example of a case in which a plurality of correction curves is stored.
FIG. 12 is a table illustrating an example of a case in which a plurality of correction curves is stored.

In the following, an example in which a plurality of correction curves are stored in advance, and a correction curve associated with the calculated average brightness is obtained is described. As illustrated in FIG. 11, using the method described above, the exponential functions "y" for a plurality of "$\alpha$" are prepared in the correction curve DB. The correction curves 1 to 7 illustrated in FIG. 11 are stored in the correction curve DB in such a manner that, as illustrated in FIG. 12, the "average brightness" and the "selected curves" are associated each other: "0 to 6, 1", "7 to 12, 2", "13 to 20, 3", "21 to 25, 4", "26 to 30, 5", "31 to 40, 6", and "40 or more, 7". FIGS. 11 and 12 are schematic diagrams illustrated an example case of storing a plurality of correction curves.

Subsequently, in a similar manner as in the first, second, and third embodiments, the image correction apparatus calculates average brightness of the dark pixels or the dark region in the input image, obtains a correction curve associated with the calculated average brightness from the correction curve DB, and corrects the input image using the obtained correction curve. For example, if the average brightness of the dark pixels or the dark region in the input image is calculated to be "13", the image correction apparatus obtains the correction curve 3, which is associated with the calculated average brightness "13", from the correction curve DB and corrects the input image using the obtained correction curve 3.

Advantage of the Fourth Embodiment

As described above, according to the fourth embodiment, a plurality of correction curves, which is used to determine the correction amount and is associated with the calculated average brightness, is stored in the correction curve DB, a correction curve associated with the calculated average brightness is obtained from the correction curve DB, and the input image is corrected on the basis of the obtained correction curve. Accordingly, the input image can be corrected by determining a suitable correction amount according to the average brightness of the dark pixels (portion) in a bright image.

[e]Fifth Embodiment

Apart from the embodiments of the present invention, it is also possible to implement various other embodiments. As described below, another embodiment is described in the following categories: (1) method of determining a correction amount, (2) system configuration, etc. and (3) programs.

(1) Method of Determining a Correction Amount

For example, as has been mentioned in the first, second, third, and fourth embodiments, the input image is corrected using the correction curves stored in advance; however, the present invention is not limited thereto. For example, it is possible to calculate a correction curve for each of the received input images using the method of calculating the correction curves described in the fourth embodiment and to correct the input image using the calculated correction curve. By doing so, the correction amount can be determined for each input image. As a result, it is possible to correct the images in a high quality manner by further reliably preventing occurrence of a black floating phenomenon or a black defacement phenomenon.

(2) System Configuration, Etc.

Of the processing described in the embodiment, all or part of the processing (e.g., receiving an input image) explained as being automatically performed can be manually performed. Furthermore, the processing procedures, the control procedures, the specific names, and the information containing various kinds of data or parameters described in the above specification or illustrated in the drawings (for example, FIGS. 3, 6, and 9 to 12) can be arbitrarily changed unless otherwise noted.

The components of each device illustrated in the drawings are only for conceptually illustrating the functions thereof and are not necessarily physically configured as illustrated in the drawings. In other words, the specific shape of a separate or integrated device is not limited to the drawings; however, all or part of the device can be configured by functionally or physically separating or integrating any units (e.g., integrating the brightness detecting unit and the bright image determining unit) on the basis of various loads or use conditions. Furthermore, all or any of the processing functions performed by each unit can be implemented by a CPU and programs analyzed and executed by the CPU or implemented as hardware by wired logic.

(3) Programs

Various kinds of processing described in the embodiments can be implemented by executing programs written in advance for a computer such as a personal computer or a workstation. Accordingly, a computer system that executes programs having the same function as those in the above-described embodiment is described in another embodiment below.

Figure 13:
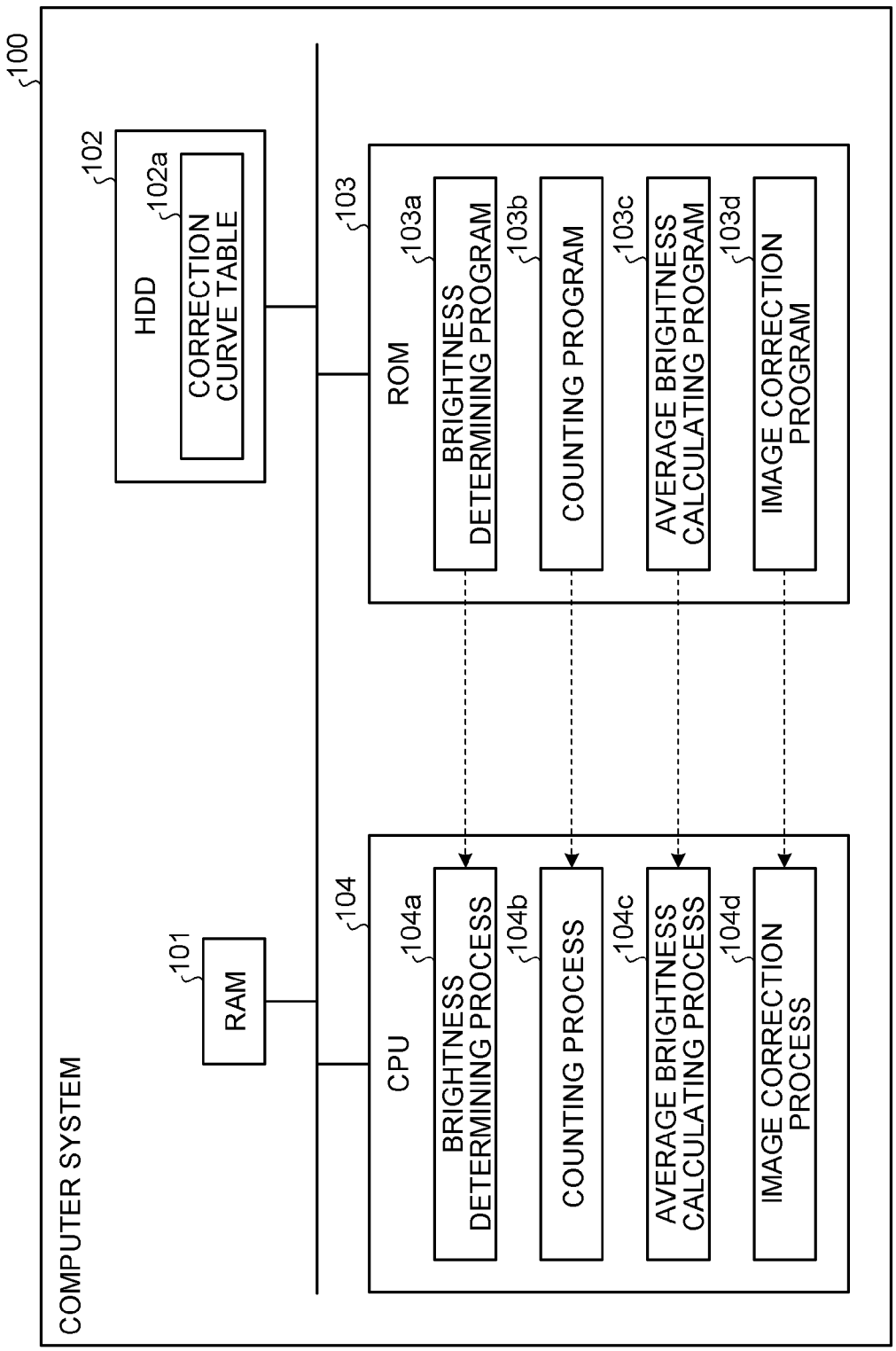
FIG. 13 is a block diagram illustrating an example of a computer system that executes an image correction program.

FIG. 13 is a block diagram illustrating an example of a computer system that executes the image correction program. As illustrated in FIG. 13, a computer system 100 includes a RAM 101, an HDD 102, a ROM 103, and a CPU 104. The ROM 103 stores, in advance, programs exhibiting the same function as the above-described embodiments, i.e., as illustrated in FIG. 13, a brightness determining program 103a, a counting program 103b, an average brightness calculating program 103c, and an image correction program 103d.

As illustrated in FIG. 13, by reading and executing these programs 103a to 103d, the CPU 104 functions as a brightness determining process 104a, a counting process 104b, an average brightness calculating process 104c, and an image correction process 104d. Furthermore, the brightness determining process 104a corresponds to the brightness calculating unit 21 and the bright image determining unit 22 illustrated in FIG. 2. Similarly, the counting process 104b corresponds to the dark pixel counting unit 23, the average brightness calculating process 104c corresponds to the average brightness calculating unit 40, and the image correction process 104d corresponds to the image correction unit 25.

The HDD 102 includes a correction curve table 102a that stores a plurality of correction curves, in which input pixels are associated with the converted output pixels and used to determine the correction amount. The correction curve table 102a corresponds to the correction curve DB 14 illustrated in FIG. 2.

The above-described programs 103a to 103d are not necessarily stored in the ROM 103. For example, they can be stored in a "portable physical medium" as a computer-readable storage medium such as a flexible disk (FD), a CD-ROM, a magneto-optic (MO) disk, a DVD disk, an IC card, and the like that can be inserted into the computer system 100; a "fixed physical medium" as a computer-readable storage medium such as a hard disk drive (HDD) that can be arranged inside/outside the computer system 100; and "another computer system" connected to the computer system 100 via a public circuit, the Internet, a LAN, a WAN, and the like and the computer system 100 then reads and executes the programs from the above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image correction apparatus for correcting an input image on a basis of a correction amount calculated from the input image, the image correction apparatus comprising:

a brightness determining unit that calculates a feature value of average brightness of the input image from pixel values of pixels in the input image and determines whether the calculated feature value is equal to or greater than a first threshold;

a counting unit that counts the number of pixels having a value equal to or less than a second threshold in the input image that is determined, using the brightness determining unit, to be a bright image with the feature value equal to or greater than the first threshold;

an average brightness calculating unit that calculates a feature value of average brightness from pixel values of the pixels counted by the counting unit; and an image correction unit that determines the correction amount, on a basis of whether the feature value calculated by the average brightness calculating unit is equal to or greater than a third threshold or whether, from among the total number of the pixels counted by the counting unit, the number of the pixels having the value equal to or greater than the third threshold is equal to or greater than a fourth threshold, and corrects the input image using the determined correction amount.

2. The image correction apparatus according to claim 1, wherein if the feature value calculated by the average brightness calculating unit is equal to or greater than the third threshold, or if, from among the total number of the pixels counted by the counting unit, the number of the pixels having the value equal to or greater than the third threshold is equal to or greater than the fourth threshold, the image correction unit determines the correction amount such that the input image becomes brightened, and if the feature value calculated by the average brightness calculating unit is less than the third threshold, or if, from among the total number of the pixels counted by the counting unit, the number of the pixels having the value equal to or greater than the third threshold is less than the fourth threshold, the image correction unit determines the correction amount such that the input image becomes darkened and corrects the input image using the determined correction amount.

3. The image correction apparatus according to claim 1, further comprising a correction curve storing unit that stores therein a plurality of correction curves that are used to determine the correction amount, the correction curves being associated with the feature values calculated by the average brightness calculating unit, wherein the image correction unit obtains, from the correction curve storing unit, a correction curve associated with the feature value calculated by the average brightness calculating unit and corrects the input image according to the obtained correction curve.

4. The image correction apparatus according to claim 1, further comprising a region calculating unit that calculates, for the input image determined using the brightness determining unit to be a bright image with the feature value equal to or greater than the first threshold, a region in which the pixels having the value equal to or less than the second threshold are continuously present by referring to each of the pixels in the input image, wherein the average brightness calculating unit calculates a feature value of average brightness in the region on a basis of the pixel values of the pixels in the region calculated by the region calculating unit, and on a basis of whether the feature value in the region calculated by the average brightness calculating unit is equal to or greater than the third threshold, the image correction unit determines the correction amount and corrects the input image using the determined correction amount.

5. The image correction apparatus according to claim 4, wherein if the size of the region calculated by the region calculating unit is equal to or greater than a fifth threshold, on a basis of whether the feature value in the region calculated by the average brightness calculating unit is equal to or greater than the third threshold, the image correction unit determines the correction amount and corrects the input image using the determined correction amount.

6. An image correction method for correcting an input image on a basis of a correction amount calculated from the input image, the image correction method comprising:
calculating a feature value of average brightness of the input image from pixel values of pixels in the input image and determining whether the calculated feature value is equal to or greater than a first threshold;
counting the number of pixels having a value equal to or less than a second threshold in the input image that is determined, at the calculating and determining the feature value, to be a bright image with the feature value equal to or greater than the first threshold;
calculating a feature value of average brightness from pixel values of the pixels counted at the counting; and
determining the correction amount, on a basis of whether the feature value calculated at the calculating the feature value is equal to or greater than a third threshold or whether, from among the total number of the pixels counted at the counting, the number of the pixels having the value equal to or greater than the third threshold is equal to or greater than a fourth threshold, and correcting the input image using the determined correction amount.

7. The image correction method according to claim 6, wherein
if the feature value calculated at the calculating the feature value is equal to or greater than the third threshold, or if, from among the total number of the pixels counted at the counting, the number of the pixels having the value equal to or greater than the third threshold is equal to or greater than the fourth threshold, the determining and correcting includes determining the correction amount such that the input image becomes brightened, and
if the feature value calculated at the calculating the feature value is less than the third threshold, or if, from among the total number of the pixels counted at the counting, the number of the pixels having the value equal to or greater than the third threshold is less than the fourth threshold, the determining and correcting includes determining the correction amount such that the input image becomes darkened and correcting the input image using the determined correction amount.

8. The image correction method according to claim 6, further comprising storing, in a correction curve storing unit, a plurality of correction curves that are used to determine the correction amount, the correction curves being associated with the feature values calculated at the calculating the feature value, wherein
the determining and correcting includes obtaining, from the correction curve storing unit, a correction curve associated with the feature value calculated at the calculating the feature value and correcting the input image according to the obtained correction curve.

9. The image correction method according to claim 6, further comprising calculating, for the input image determined at the calculating and determining the feature value to be a bright image with the feature value equal to or greater than the first threshold, a region in which the pixels having the value equal to or less than the second threshold are continuously present by referring to each of the pixels in the input image, wherein
the calculating the feature value includes calculating a feature value of average brightness in the region on a basis of the pixel values of the pixels in the region calculated at the calculating the region, and on a basis of whether the feature value in the region calculated at the calculating the feature value is equal to or greater than the third threshold, the determining and correcting includes determining the correction amount and correcting the input image using the determined correction amount.

10. The image correction method according to claim 9, wherein if the size of the region calculated at the calculating the region is equal to or greater than a fifth threshold, on a basis of whether the feature value in the region calculated at the calculating the feature value is equal to or greater than the third threshold, the determining and correcting includes determining the correction amount and correcting the input image using the determined correction amount.

11. A non-transitory computer-readable storage medium that stores therein an image correction program for correcting an input image on a basis of a correction amount calculated from the input image, the image correction program causing a computer to execute a process comprising:
calculating a feature value of average brightness of the input image from pixel values of pixels in the input image and determining whether the calculated feature value is equal to or greater than a first threshold;
counting the number of pixels having a value equal to or less than a second threshold in the input image that is determined, at the calculating and determining the feature value, to be a bright image with the feature value equal to or greater than the first threshold;
calculating a feature value of average brightness from pixel values of the pixels counted at the counting; and
determining the correction amount, on a basis of whether the feature value calculated at the calculating the feature value is equal to or greater than a third threshold or whether, from among the total number of the pixels counted at the counting, the number of the pixels having the value equal to or greater than the third threshold is equal to or greater than a fourth threshold, and correcting the input image using the determined correction amount.

12. The non-transitory computer-readable storage medium according to claim 11, wherein
if the feature value calculated at the calculating the feature value is equal to or greater than the third threshold, or if, from among the total number of the pixels counted at the counting, the number of the pixels having the value equal to or greater than the third threshold is equal to or greater than the fourth threshold, the determining and correcting includes determining the correction amount such that the input image becomes brightened, and
if the feature value calculated at the calculating the feature value is less than the third threshold, or if, from among the total number of the pixels counted at the counting, the number of the pixels having the value equal to or greater than the third threshold is less than the fourth threshold, the determining and correcting includes determining the correction amount such that the input image becomes darkened and correcting the input image using the determined correction amount.

13. The non-transitory computer-readable storage medium according to claim 11, the process further comprising storing, in a correction curve storing unit, a plurality of correction curves that are used to determine the correction amount, the correction curves being associated with the feature values calculated at the calculating the feature value, wherein
the determining and correcting includes obtaining, from the correction curve storing unit, a correction curve associated with the feature value calculated at the calculating the feature value and correcting the input image according to the obtained correction curve.

14. The non-transitory computer-readable storage medium according to claim 11, the process further comprising calculating, for the input image determined at the calculating and determining the feature value to be a bright image with the feature value equal to or greater than the first threshold, a region in which the pixels having the value equal to or less than the second threshold are continuously present by referring to each of the pixels in the input image, wherein the calculating the feature value includes calculating a feature value of average brightness in the region on a basis of the pixel values of the pixels in the region calculated at the calculating the region, and on a basis of whether the feature value in the region calculated at the calculating the feature value is equal to or greater than the third threshold, the determining and correcting includes determining the correction amount and correcting the input image using the determined correction amount.

15. The non-transitory computer-readable storage medium according to claim 14, wherein if the size of the region calculated at the calculating the region is equal to or greater than a fifth threshold, on a basis of whether the feature value in the region calculated at the calculating the feature value is equal to or greater than the third threshold, the determining and correcting includes determining the correction amount and correcting the input image using the determined correction amount.

* * * * *